(12) United States Patent
Grubb

(10) Patent No.: US 12,195,682 B2
(45) Date of Patent: Jan. 14, 2025

(54) PROCESS AND PLANT FOR PRODUCING HYDROCARBONS FROM A SOLID RENEWABLE FEEDSTOCK WITH REDUCED $CO_2$-FOOTPRINT

(71) Applicant: Topsoe A/S, Kgs. Lyngby (DK)

(72) Inventor: Mikala Grubb, Vanloese (DK)

(73) Assignee: Topsoe A/S, Kgs. Lyngby (DK)

( * ) Notice: Subject to any disclaimer, the term of this patent is extended or adjusted under 35 U.S.C. 154(b) by 0 days.

(21) Appl. No.: 18/260,184

(22) PCT Filed: Jan. 17, 2022

(86) PCT No.: PCT/EP2022/050863
§ 371 (c)(1),
(2) Date: Jun. 30, 2023

(87) PCT Pub. No.: WO2022/152896
PCT Pub. Date: Jul. 21, 2022

(65) Prior Publication Data
US 2024/0141241 A1    May 2, 2024

(30) Foreign Application Priority Data
Jan. 18, 2021   (EP) .................................... 21152112

(51) Int. Cl.
*C10G 69/02* (2006.01)
*B01D 53/047* (2006.01)
*B01D 53/14* (2006.01)

(52) U.S. Cl.
CPC .......... *C10G 69/02* (2013.01); *B01D 53/047* (2013.01); *B01D 53/1468* (2013.01);
(Continued)

(58) Field of Classification Search
CPC .......... C04B 20/023; C04B 2103/0088; C04B 28/04; C04B 7/26; C04B 7/345;
(Continued)

(56) References Cited

U.S. PATENT DOCUMENTS 8,324,438 B2   12/2012   Brandvold et al.
8,492,600 B2    7/2013   Marker et al.
(Continued)

FOREIGN PATENT DOCUMENTS

EP          535505 A1    4/1993
EP         2707460 A1    3/2014
(Continued)

OTHER PUBLICATIONS

Brown (Dec. 2020) "Heterodoxy in Fast Pyrolysis of Biomass," 35, 2, 987-1010. https://dx.doi.org/10.1021/acs.energyfuels.0c03512.
(Continued)

*Primary Examiner* — Ellen M Mcavoy
*Assistant Examiner* — Chantel Graham
(74) *Attorney, Agent, or Firm* — Leydig, Voit & Mayer, Ltd.

(57) ABSTRACT

Process and plant for producing hydrocarbon products from a solid renewable feed-stock, where in a thermal decomposition section such as a pyrolysis section for the treatment of the solid renewable feedstock, a pyrolysis off-gas stream and a pyrolysis oil stream are generated, and where after hydroprocessing of the pyrolysis oil in a hydroprocessing section, a hydrogen-rich stream and an off-gas stream comprising hydrocarbons are produced. A portion of the hydrogen-rich stream is used as a recycle gas stream in the hydroprocessing section for the production of said hydrocarbon products, such as naphtha and diesel, and another portion may be used for hydrogen production in a hydrogen producing unit, while the off-gas stream is used together with the pyrolysis off-
(Continued)

stream in the hydrogen producing unit. The produced hydrogen, i.e. make-up hydrogen, is used in the hydroprocessing section.

19 Claims, 1 Drawing Sheet

(52) U.S. Cl.
CPC .... *B01D 2256/16* (2013.01); *B01D 2257/304* (2013.01); *C10G 2300/1003* (2013.01); *C10G 2300/1014* (2013.01); *C10G 2300/4081* (2013.01)

(58) Field of Classification Search
CPC .. C04B 7/43; C04B 7/47; C04B 18/08; C04B 18/141; Y02P 40/10; Y02P 40/121; Y02P 40/18; Y02W 30/91; C10G 21/20; C10G 2300/207; C10G 29/20
See application file for complete search history.

(56) References Cited

U.S. PATENT DOCUMENTS

| 8,853,475 | B2 | 10/2014 | Kalnes |
| 2014/0275666 | A1 | 9/2014 | Bauer et al. |

FOREIGN PATENT DOCUMENTS

| EP | 2814916 | B1 | 4/2019 | |
| EP | 3164472 | B1 | 4/2019 | |
| EP | 3347438 | B1 | 2/2020 | |
| WO | WO-2011014345 | A1 * | 2/2011 | ............. C07C 7/005 |
| WO | WO-2015101713 | A1 * | 7/2015 | ............. C01B 3/38 |
| WO | WO 2019/228797 | A1 | 12/2019 | |
| WO | WO 2020/148343 | A1 | 7/2020 | |
| WO | WO-2020148343 | A2 * | 7/2020 | ............. B01J 21/04 |
| WO | WO 2021/180808 | A1 | 9/2021 | |
| WO | WO 2022/008508 | A1 | 1/2022 | |
| WO | WO 2022/152900 | A1 | 7/2022 | |

OTHER PUBLICATIONS

Dybkjaer (1995) "Tubular reforming and autothermal reforming of natural gas—an overview of available processes", Fuel Processing Technology 42, 85-107.

European Search Report dated Jul. 2, 2021 in corresponding European Application No. 21152117.4.

European Search Report dated Jun. 30, 2021 in corresponding European Application No. 21152112.5.

Gollakota et al. (2018) "A review of hydrothermal liquefaction of biomass", Renewable and Sustainable Energy Reviews, vol. 81, Part 1, p. 1378-1392.

International Search Report and Written Opinion, dated Apr. 25, 2022, corresponding to International Application No. PCT/EP2022/050863, 18 pp.

International Search Report and Written Opinion, dated Apr. 8, 2022, corresponding to International Application No. PCT/EP2022/050877, 15 pp.

Ong et al. (2018) "Hydrothermal liquefaction of Radiata Pine with Kraft black liquor for integrated biofuel production," Journal of Cleaner Production, Elsevier, Amsterdam, NL, vol. 199, pp. 737-750, XP085444852, ISSN: 0959-6526, DOI: 10.1016/J.JCLEPRO.2018.07.218.

Panisko et al. (2015) "Characterization of the aqueous fractions from hydrotreatment and hydrothermal liquefaction of lignocellulosic feedstocks," Biomass and Bioenergy, Pergamon, Amsterdam, NL, vol. 74, pp. 162-171, XP029144799, ISSN: 0961-9534, DOI: 10.1016/J.BIOMBIOE.2015.01.011.

Rostrup-Nielsen et al. (2002) "Large-scale Hydrogen Production", CATTECH 6, 150-159.

Shumeiko et al. (Sep. 2020) "Efficient one-stage bio-oil upgrading over sulfide catalysts", ACS Sus-tainable Chem. Eng. 8, 15149-15167.

* cited by examiner

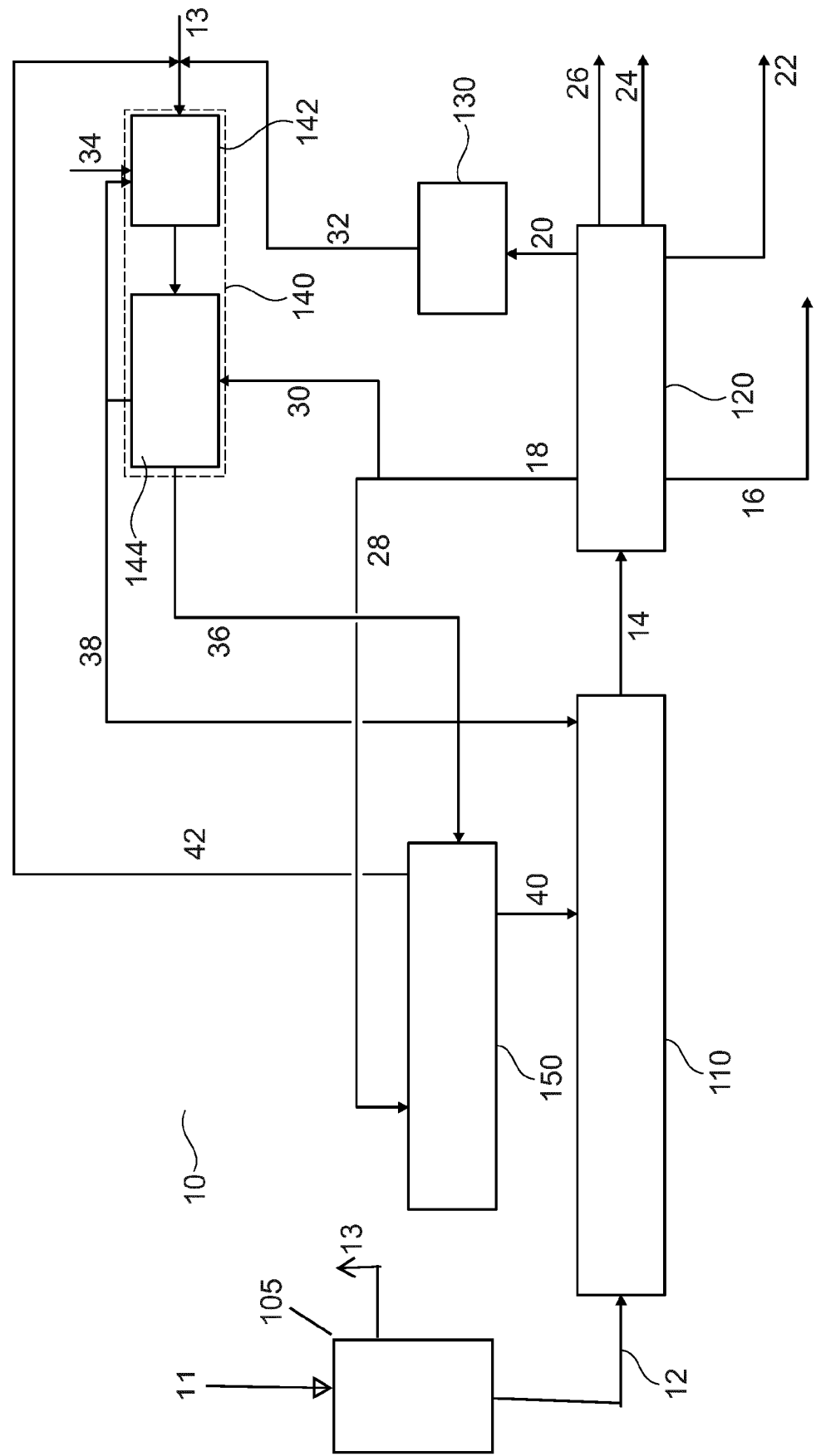

PROCESS AND PLANT FOR PRODUCING HYDROCARBONS FROM A SOLID RENEWABLE FEEDSTOCK WITH REDUCED $CO_2$-FOOTPRINT

CROSS-REFERENCE TO RELATED APPLICATIONS

This application is a U.S. National Stage Application filed under 35 U.S.C. § 371 of PCT/EP2022/050863 filed Jan. 17, 2022 (WO 2022/152896), which claims priority to and the benefit of European Patent Application Serial No. 21152112.5, filed Jan. 18, 2021, which are each hereby incorporated by reference in its entirety.

FIELD OF THE INVENTION

The present invention relates to a process and plant for producing a hydrocarbon product boiling in the transportation fuel range, in particular any of the diesel fuel boiling range, jet fuel boiling range and naphtha boiling range, by the thermal decomposition, for instance by pyrolysis, of a solid renewable feedstock such as lignocellulosic biomass, thereby producing a first off-gas stream, such as pyrolysis off-gas, and a liquid oil, such as pyrolysis oil. The liquid oil is upgraded by hydroprocessing and separation thereby producing said hydrocarbon products, while the first off-gas stream, together with a second off-gas stream from said hydroprocessing and separation, is used for producing hydrogen in a hydrogen producing unit. At least a part of the hydrogen from the hydrogen producing unit is used in said hydroprocessing, while the produced naphtha may be upgraded into valuable products such as gasoline.

BACKGROUND OF THE INVENTION

There is a growing interest in producing hydrocarbons such as diesel, jet fuel and naphtha from renewable feedstocks by hydroprocessing, such as hydrotreating. Overall, hydrotreating of renewable feedstock (feed rich in e.g. oxygenates including vegetable oils and others) requires high amount of hydrogen gas consumption. Some of the renewable feed also contain nitrogen. Removing nitrogen also requires hydrogen. To produce this high amount of hydrogen, requirement of hydrocarbon feed e.g. natural gas as feed and fuel is very high. This, however, will also increase the $CO_2$ footprint.

There is also growing interest to produce hydrocarbons, in particular hydrocarbon fuels such as diesel and gasoline (transportation fuels) from solid renewable feedstocks, such as a lignocellulosic biomass, by pyrolysis and subsequent hydroprocessing. The pyrolysis generates a pyrolysis oil stream and a pyrolysis off-gas which often is flared to the atmosphere.

U.S. Pat. No. 8,492,600 discloses a self-sustaining process for producing high quality liquid fuels from biomass in which the biomass is hydropyrolyzed in a reactor vessel containing molecular hydrogen and a deoxygenating catalyst, producing a partially deoxygenated hydropyrolysis liquid, which is hydrogenated using a hydroconversion catalyst, producing a substantially fully deoxygenated hydrocarbon liquid and a gaseous mixture comprising CO and light hydrocarbon gases (C1-C3). The gaseous mixture is reformed in a steam reformer, producing reformed molecular hydrogen, which is then introduced into the reactor vessel for hydropyrolizing the biomass. The deoxygenated hydrocarbon liquid product is further separated to produce diesel fuel, gasoline, or blending components for gasoline and diesel fuel.

U.S. Pat. No. 8,853,475 discloses a process for producing a renewable hydrocarbon fuel. The process includes providing a lignocellulosic material to a pyrolysis zone to produce a stream including a pyrolysis oil, providing the pyrolysis oil stream to a refining zone producing a refined stream, providing at least a portion of the refined stream to a reforming zone producing a stream including hydrogen, providing at least a portion of the hydrogen stream to the refining zone; and recovering the renewable hydrocarbon fuel from the refined stream.

EP 2814916 A discloses a system for processing carbonaceous feed by using a pyrolyzer kiln for pyrolysis the carbonaceous feed, the kiln operating in a slow pyrolysis process in which the carbonaceous feed is pyrolysed for a period of minutes in order to produce primarily a gaseous output fraction; a steam reformer positioned downstream of the kiln to which combustion gasses from the pyrolyzer kiln are fed, a water scrubber positioned gas flow-wise downstream of the steam reformer, a methanation stage, and a $CO_2$ scrubbing stage.

EP 3347438 A1 discloses a process for producing liquid hydrocarbon products from a biomass feedstock containing a solid lignocellulosic material, the process comprising the steps of: a) contacting the feedstock with a first hydropyrolysis catalyst composition and molecular hydrogen in a first hydropyrolysis reactor vessel to produce a product stream comprising a partially deoxygenated hydropyrolysis product, $H_2O$, $H_2$, $CO_2$, CO, C1-C3 gases, char and catalyst fines; b) removing said char and catalyst fines from the product stream; c) hydroconverting said partially deoxygenated hydropyrolysis product in a hydroconversion reactor vessel in the presence of one or more hydroconversion catalyst and of the $H_2O$, $CO_2$, CO, $H_2$, and C1-C3 gas) generated in step a), to produce a vapour phase product comprising substantially fully deoxygenated hydrocarbon product, $H_2O$, CO, $CO_2$, and C1-C3 gases, wherein one or more of the first hydropyrolysis catalyst and the hydroconversion catalyst is prepared by a process comprising combining a porous support with one or more catalytically active metals selected from Group VI and Group VIII of the Periodic Table. The vapour phase may be condensed to provide a fully deoxygenated C4+ hydrocarbon liquid and a gas phase comprising $H_2O$, CO, $CO_2$, and C1-C3 gases which are subjected to reforming and water gas shift to produce hydrogen.

Similarly, EP 3164472 A1 describes a process for producing liquid hydrocarbon products from a solid lignocellulose containing biomass feedstock, comprising the use of a hydropyrolysis reactor under the presence of a catalyst and hydrogen; thereby producing a product stream comprising partially deoxygenated hydropyrolysis product, $H_2O$, $H_2$, $CO_2$, CO, C1-C3 gases, char and catalyst fines; and after removing the char and catalyst fines the product stream is treated in a catalytic hydroconversion reactor, thereby producing a vapour phase product comprising substantially fully deoxygenated hydrocarbon product, $H_2O$, CO, $CO_2$, hydrogen and C1-C3 gases. The process further comprises condensing the vapour phase to provide a liquid phase product comprising substantially fully deoxygenated C4+ hydrocarbon liquid and aqueous material as well as a gas phase product comprising $H_2O$, CO, $CO_2$, and C1-C3 gases which is subjected to a reforming and water-gas process to produce hydrogen.

U.S. Pat. No. 8,324,438 discloses a process for producing at least one blended fuel from: a) a paraffin rich component which is generated from glycerides and free fatty acids in feedstocks such as plant and animal oils, and b) a cyclic rich component which is generated from biomass derived pyrolysis oil. Hydrogen generated in a steam reforming zone is used in the process.

WO 2015/101713 A1 describes the integration of pyrolysis, hydroprocessing and hydrogen production, by conducting pyrolysis off-gas together with an off-gas from hydroprocessing to a hydrogen plant. The off-gas from hydroprocessing to the hydrogen plant is a $H_2$-rich stream from a separator, such as amine scrubber and which is used to remove $H_2S/CO/CO_2$ from the $H_2$-rich stream. The thus cleaned $H_2$-rich stream is then fed to the hydrogen plant. This citation is at least silent about providing hydrogen to the hydrogen plant from an off-gas produced farther downstream.

SUMMARY OF THE INVENTION

The integration of a hydroprocessing stage with a dedicated hydrogen production unit is very important for minimizing the carbon dioxide emissions, but in order to reduce such emissions, the consumption of natural gas, which is normally used as hydrocarbon feed in the hydrogen producing unit, needs to be significantly reduced. While the above integration reduces the total consumption of hydrogen and thereby the natural gas consumption, it would be desirable to be able to replace most or all of the natural gas used in the hydrogen producing unit. However, replacing the natural gas for the hydrogen production requires a sacrifice of naphtha generated in the hydroprocessing, since this is used as hydrocarbon feed in the hydrogen production unit, thereby impairing the potential use of the naphtha for either gasoline or petrochemical production.

We have found that apart from the reduction of the total consumption of hydrogen, it is now also possible to integrate a thermal decomposition section such as a pyrolysis section and a hydroprocessing section and downstream separation section, together with a hydrogen production unit and minimize the energy consumption for the overall process/plant i.e. plant comprising said pyrolysis, hydroprocessing/separation and hydrogen producing unit, mainly by minimizing or eliminating the natural gas consumption for producing hydrogen required for hydroprocessing of the renewable feed, thereby drastically reducing the carbon dioxide footprint of the plant.

Accordingly, in a first aspect, the invention provides a process for producing a hydrocarbon product, said process comprising the steps of:
i) passing a solid renewable feedstock through a thermal decomposition section, such as a pyrolysis section, e.g. a fast pyrolysis section, for producing:
a first off-gas stream, such as a pyrolysis off-gas stream, comprising hydrocarbons, and a liquid oil stream, such as a pyrolysis oil stream;
ii) passing the liquid oil stream through a hydroprocessing section for producing a main hydroprocessed stream;
iii) passing the main hydroprocessed stream to a separation section for producing:
an aqueous stream,
a hydrogen-rich stream,
a second off-gas stream comprising hydrocarbons, and said hydrocarbon product, boiling at above 50° C.;
iv) passing the hydrogen-rich stream to the hydroprocessing section;

v) passing the first off-gas stream from step i) and/or the second off-gas stream from step iii) to a hydrogen producing unit, for producing a make-up hydrogen stream;
vi) passing the make-up hydrogen stream to the hydroprocessing section;
wherein in step iii) the separation section comprises:
iii-1) passing the main hydrotreated stream to a separator, preferably a cold separator, for producing said aqueous stream, said hydrogen-rich stream, and a heavy hydrocarbon stream;
iii-2) passing the heavy hydrocarbon stream to a fractionation section for producing said second off-gas stream and said hydrocarbon product;
and
wherein prior to conducting step v), said second off-gas stream from step iii) passes to a separation unit for removing $H_2S$.

In an embodiment, said separation unit is at least one of an amine absorption unit, a caustic scrubber, and a sulfur absorbent unit.

Hence, contrary to the prior art, by the present invention the $H_2$-rich stream from step iii) may be sent "uncleaned", i.e. without removing e.g. $H_2S$, to hydroprocessing, and instead the $H_2S$ is removed from the second off-gas in the fractionation section, which is a much smaller stream than the above $H_2$-rich stream, thus enabling a much smaller separation unit such as a much smaller amine wash, and thereby simplifying the integration in the process as well as reducing capital and operating expenses. Furthermore, the $H_2$-rich stream represents a source of sulfur in hydroprocessing section, in particular a hydrodeoxygenation (HDO) therein, by keeping the HDO catalyst in sulfided form. The external addition of a sulfur agent is thereby significantly reduced. Suitably, a nickel-molybdenum catalyst for HDO is provided, as in applicant's co-pending patent application EP 20162755.1 (WO 2021180808).

Accordingly, in an embodiment, said hydrogen-rich stream (of step iii) is not subjected to a separation stage for removing $H_2S$ and/or $CO_2$, optionally also for removing NH 3 and/or CO, prior to being passed to the hydroprocessing section, in particular prior to being passed to a first catalytic hydrotreating unit therein, as illustrated in the appended FIGURE. The first catalytic hydrotreating unit is suitably for HDO. The entire or a portion of the $H_2$-rich stream is passed to the hydroprocessing section.

As used herein, the term "section" for instance "hydroprocessing section", means a physical section comprising a unit or combination of units for conducting one or more steps and/or sub-steps for producing said main hydroprocessed stream, as it will become apparent from the description farther below.

As used herein, the term "hydrogen producing unit" means a hydrogen producing section, Hence, the hydrogen producing unit means also a physical section comprising a unit or combination of units for conducting one or more steps and/or sub-steps during the production of the make-up hydrogen stream, as it also will become apparent from the description farther below.

It would be understood that the hydrogen stream produced in the hydrogen producing unit is referred as make-up hydrogen stream.

It would be understood that the first off-gas stream and the liquid oil stream are derived from the thermal decomposition of a solid renewable feedstock. The first off-gas stream (from step i) is passed to the hydrogen processing unit (in step v) separate from the liquid oil stream being upgraded in the hydroprocessing (step ii) and separation section (step iii). Thus, the first off-gas is not withdrawn as part of or as a result of the upgrading of the liquid oil. A simpler process is thereby obtained, as the first off-gas is withdrawn and used for hydrogen production early in the process.

As used herein, the term "thermal decomposition" shall for convenience be used broadly for any decomposition process, in which a material is partially decomposed at elevated temperature (typically 250° C. to 800° C. or even 1000° C.), in the presence of substoichiometric amount of oxygen (including no oxygen). The product will typically be a combined liquid and gaseous stream, as well as an amount of solid char. The term shall be construed to include processes known as pyrolysis and hydrothermal liquefaction, both in the presence and absence of a catalyst.

In an embodiment, the thermal decomposition section is a pyrolysis section, such as a fast pyrolysis section, as defined farther below, thereby producing said first off-gas stream as a pyrolysis off-gas stream and said liquid oil stream as a pyrolysis oil stream. Thus, when the thermal decomposition section is a pyrolysis section, the first off-gas is also referred as pyrolysis off-gas, and the liquid oil stream is referred as pyrolysis oil stream. The pyrolysis oil is thus upgraded in the hydroprocessing and separation sections (step ii and iii) after it has been condensed.

For the purposes of the present invention, the pyrolysis section generates two main streams, namely a pyrolysis off-gas stream and a pyrolysis oil stream. The pyrolysis section may be in the form of a fluidized bed, transported bed, or circulating fluid bed, as is well known in the art. For instance, the pyrolysis section may comprise a pyrolyser unit (pyrolysis reactor), cyclone(s) to remove particulate solids such as char, and a cooling unit for thereby producing said pyrolysis off-gas stream and said pyrolysis oil stream, i.e. condensed pyrolysis oil. The pyrolysis off-gas stream comprises light hydrocarbons e.g. C1-C4 hydrocarbons, CO and $CO_2$. The pyrolysis oil stream is also referred as bio-oil and is a liquid substance rich in blends of molecules usually consisting of more than two hundred different compounds including aldehydes, ketones and/or other compounds such as furfural having a carbonyl group, resulting from the depolymerisation of products treated in pyrolysis.

For the purposes of the present invention, the pyrolysis section is preferably fast pyrolysis, also referred in the art as flash pyrolysis. Fast pyrolysis means the thermal decomposition of a solid renewable feedstock in the absence of oxygen, at temperatures in the range 350-650° C. e.g. about 500° C. and reaction times of 10 seconds or less, such as 5 seconds or less, e.g. about 2 sec. Fast pyrolysis may for instance be conducted by autothermal operation e.g. in a fluidized bed reactor. The latter is also referred as autothermal pyrolysis and is characterized by employing air, optionally with an inert gas or recycle gas, as the fluidizing gas. Thereby, the partial oxidation of pyrolysis compounds being produced in the pyrolysis reactor (autothermal reactor) provides the energy for pyrolysis while at the same time improving heat transfer. For details about autothermal pyrolysis, reference is given to e.g. "Heterodoxy in Fast Pyrolysis of Biomass" by Robert Brown:

https://dx.doi.org/10.1021/acs.energyfuels.0c03512

It would therefore be understood, that for the purposes of the present invention, the use of autothermal pyrolysis, i.e. autothermal operation, is a particular embodiment for conducting fast pyrolysis.

There are several types of fast pyrolysis where a catalyst is used. Sometimes an acid catalyst is used in the pyrolysis reactor to upgrade the pyrolysis vapors, this technology is called catalytic fast pyrolysis and can both be operated in an in-situ mode (the catalyst is located in the pyrolysis reactor) and an ex-situ mode (the catalyst is placed in a separate reactor). The use of a catalyst conveys the advantage of removing oxygen and thereby helping to stabilize the pyrolysis oil, thus making it easier to hydroprocess. In addition, increased selectivity towards desired pyrolysis oil compounds may be achieved.

In some cases, hydrogen is added to the catalytic pyrolysis which is called reactive catalytic fast pyrolysis. If the catalytic pyrolysis is conducted at a high hydrogen pressure (~>5 barg) it is often called catalytic hydropyrolysis.

In an embodiment, the pyrolysis stage is fast pyrolysis which is conducted without the presence of a catalyst and hydrogen, i.e. the fast pyrolysis stage is not catalytic fast pyrolysis, hydropyrolysis or catalytic hydropyrolysis. This enables a much simpler and inexpensive process.

In an embodiment, said pyrolysis off-gas stream comprises CO, $CO_2$ and light hydrocarbons such as C1-C4, and optionally also $H_2S$.

In an embodiment, the thermal decomposition section is hydrothermal liquefaction. Hydrothermal liquefaction means the thermochemical conversion of biomass into liquid fuels by processing in a hot, pressurized water environment for sufficient time to break down the solid bio polymeric structure to mainly liquid components. Typical hydrothermal processing conditions are temperatures in the range of 250-375° C. and operating pressures in the range of 40-220 bar. This technology offers the advantage of operation of a lower temperature, higher energy efficiency and lower tar yield compared to pyrolysis, e.g. fast pyrolysis. For details on hydrothermal liquefaction of biomass, reference is given to e.g. Golakota et al., "A review of hydrothermal liquefaction of biomass", Renewable and Sustainable Energy Reviews, vol. 81, Part 1, January 2018, p. 1378-1392.

By the invention the thermal decomposition section and the hydroprocessing and separation section for producing hydrocarbon products are integrated with a hydrogen producing unit in an overall process or plant by use of a stream separately withdrawn from the separation section, e.g. the second off-gas stream comprising hydrocarbons of step iii), as well as the first off-gas stream such as the pyrolysis off-gas of step i), thereby drastically reducing the consumption of natural gas used as feed and fuel in the process, or even obviating the use of natural gas.

All types of pyrolysis produce pyrolysis off-gasses containing hydrocarbons and these hydrocarbons are used to also feed the hydrogen producing unit and limit the amount of naphtha required to fully replace natural gas. Thereby, valuable naphtha will not necessarily be used to produce hydrogen and utilization of an otherwise low-value stream of off-gasses from a pyrolysis unit is utilized.

Thus, the invention enables also lower carbon dioxide emissions, complete utilization of pyrolysis off-gas, better use of solid renewable feedstocks and higher yield of naphtha i.e. a hydrocarbon product boiling in the naphtha boiling range.

In an embodiment, said hydrogen-rich stream (in step iii) comprises 50% vol. $H_2$ or more, light hydrocarbons such as C1-C4 hydrocarbons, optionally also $H_2S$ and $NH_3$, CO and $CO_2$.

In an embodiment, said second off-gas stream comprises light hydrocarbons in the form of C1-C4 hydrocarbons, $H_2$, CO, $CO_2$, and optionally also $H_2S$.

In an embodiment, said hydrocarbon product, boiling at above 50° C., is a hydrocarbon product boiling at least in one of: the diesel fuel boiling range, jet fuel boiling range, and naphtha boiling range.

By the invention, prior to conducting step v), said second off-gas stream from step iii) passes to a separation unit, the separation unit preferably being at least one of an amine absorption unit, a caustic scrubber, and a sulfur absorbent unit, for removing $H_2S$. The resulting gas stream entering the hydrogen producing unit contains therefore light hydrocarbons such as C1-C4 hydrocarbons, $H_2$, $NH_3$, CO and $CO_2$, yet no $H_2S$ or only minor amounts of $H_2S$. The second off-gas stream and the gas stream derived thereof after passing through the separation unit, contains hydrogen not consumed from the hydrotreating unit(s) of the hydroprocessing stage as soluble hydrogen in hydrocarbon phase and is suitably used as part of the feed in the hydrogen producing unit, which is described farther below.

In an embodiment, the process further comprises: vii) splitting said hydrogen-rich stream (of step iii) for forming a split hydrogen-rich stream and passing said split hydrogen-rich stream to said hydrogen producing unit. Thereby, further integration is achieved.

By "integration" is meant that the thermal decomposition section, the hydroprocessing section and the subsequent (downstream) separation section, are in fluid communication with the hydrogen producing unit.

It would be understood that the hydrogen-rich stream passing to the hydroprocessing section represents a first recycle gas stream; the second off-gas stream passing to the hydrogen producing unit, optionally after passing to a separation unit, represents a second recycle gas stream; and the split hydrogen-rich stream which is passed to the hydrogen producing unit represents a third recycle gas stream.

In an embodiment, in step ii) the hydroprocessing section comprises:
  ii-1) passing the liquid oil stream through a first catalytic hydrotreating unit under the addition of hydrogen for producing a first hydrotreated stream, e.g. comprising C1-C65 hydrocarbons;
  ii-2) passing the first hydrotreated stream to a dewaxing section comprising a second catalytic hydrotreating unit under the addition of hydrogen for producing said main hydrotreated stream.

It would be understood that the term "in step ii) the hydroprocessing section comprises" has the same meaning as the term "step ii) comprises". The same interpretation applies in any of the above or below embodiments, using similar wording.

Optionally, the process comprises using one or more additional catalytic hydrotreating units under the addition of hydrogen, such as third catalytic hydrotreating unit or a cracking section. For instance, it would be understood that when a hydrocarbon product boiling in the jet fuel range is desired, a hydrocracking unit is suitably used, for instance prior to passing the thus resulting first hydrotreated stream to the dewaxing section.

In a particular embodiment, between step ii-1) and ii-2) the process further comprises passing the first hydrotreated stream to a separator such as a high-pressure or low-pressure separator, for removing $H_2S$, $NH_3$, and $H_2O$, thereby producing said first hydrotreated stream, and optionally also producing a vapor stream, and a recycle oil stream.

The first hydrotreated stream from the first catalytic hydrotreating unit normally contains impurities, in particular $H_2S$, $NH_3$, CO and $CO_2$ which may be detrimental for the catalyst used in the subsequent dewaxing section. When the process is operated in so-called sour mode, the catalyst of the dewaxing section is a base-metal catalyst, which is resistant to impurities, thereby avoiding the need of using a separator. When operating in the so-called sweet mode, the catalyst of the dewaxing section is a noble-metal catalyst, which is sensitive to the impurities, thereby requiring the need of using the separator.

In an embodiment, prior to conducting step ii-1, i.e. prior to passing the liquid oil to a first catalytic unit under the addition of hydrogen, for instance a hydrodeoxygenation (HDO) unit, the liquid oil is stabilized by passing it to a catalytic unit under the addition of hydrogen. By the term "stabilized" is meant converting carbonyl groups present in compounds of the liquid oil, such as aldehydes, ketones and acids, into alcohols. For instance, this stabilization step can be conducted by means of NiMo based catalysts, as disclosed in Shumeico et al. "Efficient one-stage bio-oil upgrading over sulfide catalysts", ACS Sustainable Chem. Eng. 2020, 8, 15149-15167. Preferably, a catalyst system as in applicant's co-pending European patent application 21152117.4 is applied. As used herein, this stabilization step is included in the hydroprocessing section ii).

By the invention, in step iii) the separation section comprises said sub-steps:
  iii-1) passing the main hydrotreated stream to a separator, preferably a cold separator, for producing said aqueous stream, said hydrogen-rich stream, and a heavy hydrocarbon stream;
  iii-2) passing the heavy hydrocarbon stream to a fractionation section, such as stripping section, for producing said second off-gas stream, and said hydrocarbon product e.g. a hydrocarbon product boiling at least in one of: the diesel fuel boiling range, jet fuel boiling range, and naphtha boiling range.

In an embodiment, said heavy hydrocarbon stream comprises C5-C30 hydrocarbons, $H_2$, CO and $CO_2$.

In an embodiment, in step vi) the make-up hydrogen stream passes to at least one of: said first catalytic hydrotreating unit;
  said separator between step ii-1) and ii-2), such as a high-pressure stripper;
  second catalytic hydrotreating unit;
  and optionally also an additional catalytic hydrotreating unit such as a third catalytic hydrotreating unit.

In an embodiment, the hydrogen-rich stream in step iii) is passed to the first catalytic hydrotreating unit of the hydroprocessing section.

It would be understood, that the addition of hydrogen to step ii), in particular step ii-1), ii-2) and optionally also to the step in between, i.e. passing the first hydrotreated stream to a separator for removing $H_2S$ and $NH_3$, is mainly from said make-up hydrogen stream and said hydrogen-rich stream. This enables reducing the need or eliminating the need of using external hydrogen sources for the provision of the required hydrogen in the process.

In an embodiment, the separation section in step iii) also produces an LPG stream and the process further comprises feeding the LPG stream to the hydrogen producing unit.

As used herein, "LPG" means liquid petroleum gas (also referred as liquified petroleum gas), which is a gas mixture mainly comprising propane and butane, i.e. C3-C4; LPG may also comprise i-C3, i-C4 and unsaturated C3-C4 such as C4-olefins.

Optionally, natural gas is also used as part of the hydrocarbon feed to the hydrogen producing unit to assist in the hydrogen production. While some minor amounts of natural gas may optionally be used, the first off-gas e.g. pyrolysis off-gas, the second off-gas and optionally the LPG from the separation section in step iii), are used as the major portion of the hydrocarbon feed or even as the entirety of the hydrocarbon feed, i.e. as the make-up gas, required in the hydrogen producing unit. Thereby, valuable naphtha being produced is not used for the generation of hydrogen and rather the naphtha may be upgraded to high quality gasoline or used for other purposes.

It would also be understood that said hydrocarbon products, i.e. products produced according to the process of the invention, using a solid renewable feedstock, represent so-called green products or renewable products, thus the diesel product is a renewable diesel, the jet fuel is a renewable jet fuel and the naphtha is a renewable naphtha.

In an embodiment, the hydrogen producing unit comprises subjecting the first off-gas stream, the second off-gas stream and optionally the LPG stream to: cleaning in a cleaning unit, said cleaning unit preferably being a sulfur-chlorine-metal absorption or catalytic unit; optionally pre-reforming in a pre-reforming unit; catalytic steam methane reforming in a steam reforming unit; water gas shift conversion in a water gas shift unit; optionally carbon dioxide removal in a $CO_2$-separator unit; and optionally hydrogen purification in a hydrogen purification unit.

Hence, in a particular embodiment, the hydrogen producing unit comprises subjecting the first off-gas stream e.g. pyrolysis off-gas stream, the second off-gas stream and optionally the LPG stream to: cleaning in a cleaning unit, said cleaning unit preferably being a sulfur-chlorine-metal absorption or catalytic unit; optionally pre-reforming in a pre-reforming unit; catalytic steam methane reforming in a steam reforming unit; water gas shift conversion in a water gas shift unit; and carbon dioxide removal in a $CO_2$-separator unit. In a particular embodiment thereof, the hydrogen producing unit is absent of a hydrogen purification unit. Thus, from the $CO_2$-removal section, not only a $CO_2$-rich stream containing hydrocarbons, hydrogen and/or CO is generated, but also the hydrogen stream. The hydrogen stream is suitably a stream containing 95 vol. % or more, for instance 98 vol. % or more hydrogen, i.e. having a hydrogen purity of above 95 vol. %, with the balance being minor amounts of carbon containing compounds $CH_4$, CO, $CO_2$, as well as inerts $N_2$, Ar. Accordingly, a hydrogen purification unit in the hydrogen producing unit may be omitted, thereby reducing plant size, yet the resulting make-up hydrogen gas is still of such a purity that it is suitable for use in the hydroprocessing stage. At the same time, carbon produced in the process is removed as carbon dioxide in the $CO_2$-separator unit. The carbon dioxide may then be captured and transported for e.g. sequestration in geological structures, thereby further reducing the $CO_2$ emission to the atmosphere and thereby further reducing the $CO_2$-footprint of the process and plant.

In another particular embodiment, the first off-gas stream e.g. the pyrolysis off-gas stream, the second off-gas stream and optionally the LPG stream, are subjected to preheating in a fired heater prior to said pre-reforming or catalytic steam reforming, and passing a portion of the make-up hydrogen stream to the fired heater. Thereby, the hydrogen stream serves as a hydrogen fuel and further reduces carbon emissions, as the burning of e.g. natural gas in the fired heater for providing heat needed for steam reforming, is minimized.

In another particular embodiment, purification of hydrogen is conducted. Accordingly, the hydrogen producing unit comprises subjecting the first off-gas stream e.g. the pyrolysis off-gas stream, the second off-gas stream and optionally the LPG stream to: cleaning in a cleaning unit, said cleaning unit preferably being a sulfur-chlorine-metal absorption or catalytic unit; optionally pre-reforming in a pre-reforming unit; catalytic steam methane reforming in a steam reforming unit; water gas shift conversion in a water gas shift unit; optionally carbon dioxide removal in a $CO_2$-separator unit; and hydrogen purification in a hydrogen purification unit.

In a particular embodiment, the second off-gas stream (second recycle gas stream) is fed to the cleaning unit. This is an efficient way of utilizing available hydrogen in the process, as the sulfur-chlorine-metal absorption or catalytic unit normally requires addition of hydrogen.

In an embodiment, the first off-gas stream e.g. the pyrolysis off-gas stream, the second off-gas stream and optionally the LPG stream, are combined to form a single hydrocarbon feed prior to passing to the hydrogen producing unit.

In an embodiment, the hydrogen-rich stream (first recycle stream), or split hydrogen-rich stream (third recycle stream) comprises hydrogen in a concentration of 50 vol. % or higher, such as 70 vol. % hydrogen or higher, and any of said streams is passed through a hydrogen purification unit: prior to splitting said hydrogen-rich stream (first recycle stream) for forming said split hydrogen-rich stream (third recycle stream), or prior to passing the hydrogen-rich stream to the hydroprocessing stage, or prior to passing said split hydrogen-rich stream to the hydrogen producing unit. Preferably, only the split hydrogen-rich stream passes to the hydrogen purification unit.

This enables that the steam reformer size be reduced, thereby minimizing the overall capital expenses of the hydrogen producing unit.

The hydrogen purification unit may be a $H_2$-membrane separation unit, or a Pressure Swing Adsorption unit (PSA-unit).

While the above hydrogen purification unit may be a dedicated (separate) unit, in a particular embodiment the hydrogen purification unit is the hydrogen purification unit of the hydrogen producing unit and said split hydrogen-rich stream is passed through this hydrogen purification unit. This further facilitates integration and higher energy efficiency of the overall plant/process, i.e. section comprising thermal decomposition, hydroprocessing and separation sections, and the hydrogen producing unit. In addition, there is a more expedient use of the already available hydrogen purification unit of the hydrogen producing unit, since one normally would expect a requirement of this unit to provide a hydrogen stream with at least 99 vol. % $H_2$, whereas by the present invention there is a less strict requirement on hydrogen purity, as this hydrogen is used in the hydroprocessing section, in particular the first, second catalytic hydrotreatment, as well as any additional catalytic hydrotreatment, such as a third catalytic hydrotreatment.

In another particular embodiment, the hydrogen purification unit is a Pressure Swing Adsorption unit (PSA unit), said PSA unit producing a PSA off-gas stream which is used as fuel in the steam reforming unit of the hydrogen producing unit, and/or in fired heaters in the hydrogen producing unit, and/or in fired heaters in any of the catalytic hydrotreating units of the hydroprocessing section, separation units of the separation section, and/or for steam production. This enables further reduction of hydrocarbon consumption, thereby improving energy consumption FIGURES, i.e. higher energy efficiency, as PSA off-gas which otherwise will need to be burned off (flared), is expediently used in the process.

In an embodiment, the steam reforming unit is: a convection reformer, preferably comprising one or more bayonet reforming tubes such as an HTCR reformer i.e. Topsøe bayonet reformer, where the heat for reforming is transferred by convection along with radiation; a tubular reformer i.e. conventional steam methane reformer (SMR), where the heat for reforming is transferred chiefly by radiation in a radiant furnace; autothermal reformer (ATR), where partial oxidation of the hydrocarbon feed with oxygen and steam followed by catalytic reforming; electrically heated steam methane reformer (e-SMR), where electrical resistance is used for generating the heat for catalytic reforming; or combinations thereof. In particular, when using e-SMR, electricity from green resources may be utilized, such as from electricity produced by wind power, hydropower, and solar sources, thereby further minimizing the carbon dioxide footprint.

For more information on these reformers, details are herein provided by direct reference to Applicant's patents and/or literature. For instance, for tubular and autothermal reforming an overview is presented in "Tubular reforming and autothermal reforming of natural gas—an overview of available processes", Ib Dybkjær, Fuel Processing Technology 42 (1995) 85-107; and EP 0535505 for a description of HTCR. For a description of ATR and/or SMR for large scale hydrogen production, see e.g. the article "Large-scale Hydrogen Production", Jens R. Rostrup-Nielsen and Thomas Rostrup-Nielsen": https://www.topsoe.com/sites/default/files/topsoe_large_scale_hydrogen_produc.pdf Alternatively, for a description of ATR and/or SMR for large scale hydrogen production, see e.g. the article "Large-scale Hydrogen Production", Jens R. Rostrup-Nielsen and Thomas Rostrup-Nielsen", CATTECH 6, 150-159 (2002). For a description of e-SMR which is a more recent technology, reference is given to in particular applicant's WO 2019/228797 A1.

In an embodiment, the catalyst in the steam reforming unit is a reforming catalyst, e.g. a nickel based catalyst. In an embodiment, the catalyst in the water gas shift reaction is any catalyst active for water gas shift reactions. The said two catalysts can be identical or different. Examples of reforming catalysts are $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, $Ni/ZrO_2$, $Ni/MgAl_2O_3$, $Ni/CaAl_2O_3$, $Ru/MgAl_2O_3$, or $Rh/MgAl_2O_3$, a noble metal on an $Al_2O_3$ carrier, but other catalysts suitable for reforming are also conceivable. The catalytically active material may be Ni, Ru, Rh, Ir, or a combination thereof, while the ceramic coating may be $Al_2O_3$, $ZrO_2$, $MgAl_2O_3$, $CaAl_2O_3$, or a combination therefore and potentially mixed with oxides of Y, Ti, La, or Ce. The maximum temperature of the reactor may be between 850-1300° C. The pressure of the feed gas may be 15-180 bar, preferably about 25 bar. Steam reforming catalyst is also denoted steam methane reforming catalyst or methane reforming catalyst.

In an embodiment, prior to passing the make-up hydrogen stream to the hydroprocessing section, the makeup hydrogen stream passes through a compressor section comprising a make-up compressor optionally also a recycle compressor, the make-up compressor also generating a make-up hydrogen recycle stream which is added to the hydrogen producing unit, preferably directly to the first off-gas stream e.g. the pyrolysis off-gas stream and/or to the second off-gas stream (second recycle stream) entering the hydrogen producing unit, and/or to the cleaning unit of the hydrogen producing unit. This enables even better integration, since there is no need for a separate or dedicated compressor for recycling hydrogen within the hydrogen producing unit for e.g. hydrogenation of sulfur in the cleaning unit. In a particular embodiment, prior to passing the hydrogen-rich stream (first recycle gas stream) to the hydroprocessing section, the hydrogen-rich stream passes through said recycle compressor, i.e. recycle compressor comprised in the compressor section. Further integration is thereby achieved.

In an embodiment, the solid renewable feedstock is a lignocellulosic biomass including: wood products, forestry waste, and agricultural residue. In another embodiment, the solid biomass feedstock is municipal waste, in particular the organic portion thereof. For the purposes of the present application, the term "municipal waste" is interchangeable with the term "municipal solid waste" and means a feedstock containing materials of items discarded by the public, such as mixed municipal waste given the waste code 200301 in the European Waste Catalog. In a particular embodiment, the lignocellulosic biomass is forestry waste and/or agricultural residue and comprises biomass originating from plants including grass such as nature grass (grass originating from natural landscape), wheat e.g. wheat straw, oats, rye, reed grass, bamboo, sugar cane or sugar cane derivatives such as bagasse, maize and other cereals.

Any combinations of the above is also envisaged.

As used herein, the term "lignocellulosic biomass" means a biomass containing, cellulose, hemicellulose and optionally also lignin. The lignin or a significant portion thereof may have been removed, for instance by a prior bleaching step.

In an embodiment, step i) further comprises passing said solid renewable feedstock through a solid renewable feedstock preparation section comprising for instance drying for removing water and/or comminution for reduction of particle size. Any water/moisture in the solid renewable feedstock which vaporizes in for instance the pyrolysis section condenses in the pyrolysis oil stream and is thereby carried out in the process, which may be undesirable. Furthermore, the heat used for the vaporization of water withdraws heat which otherwise is necessary for the pyrolysis. By removing water and also providing a smaller particle size in the solid renewable feedstock the thermal efficiency of the pyrolysis section is increased.

In an embodiment, the first catalytic hydrotreating unit is hydrodeoxygenation (HDO), the second catalytic hydrotreating is hydrodewaxing (HDW), and an additional catalytic hydrotreating such as a third catalytic hydrotreating is hydrocracking (HCR).

Often the liquid oil, e.g. pyrolysis oil, may contain a high amount of oxygen compound and unsaturated hydrocarbon. During the hydrotreating of this feed, the oxygen is mainly removed as $H_2O$, which gives a fuel consisting of mainly naphthenes and aromatics. This is called the hydrodeoxygenation (HDO) pathway. Oxygen can also be removed by the decarboxylation pathway, which generates $CO_2$ instead of $H_2O$:

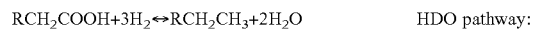
$$RCH_2COOH + 3H_2 \leftrightarrow RCH_2CH_3 + 2H_2O \qquad \text{HDO pathway:}$$

$$RCH_2COOH \leftrightarrow RCH_3 + CO_2 \qquad \text{Decarboxylation pathway:}$$

Further, while decarbonylation normally does not occur in HDO of triglycerides in typical renewable feeds, it can occur during HDO of pyrolysis oil:

$$RCH_2COH + H_2 \leftrightarrow RCH_3 + CO \qquad \text{Decarbonylation pathway:}$$

The material catalytically active in HDO (as used herein, interchangeable with the term hydrotreating, HDT), typically comprises an active metal (sulfided base metals such as nickel, cobalt, tungsten and/or molybdenum, but possibly also either elemental noble metals such as platinum and/or palladium) and a refractory support (such as alumina, silica or titania, or combinations thereof).

HDT conditions involve a temperature in the interval 250-400° C., a pressure in the interval 30-150 bar, and a liquid hourly space velocity (LHSV) in the interval 0.1-2, optionally together with intermediate cooling by quenching with cold hydrogen, feed or product The material catalytically active in hydrodewaxing HDW typically comprises an active metal (either elemental noble metals such as platinum and/or palladium or sulfided base metals such as nickel, cobalt, tungsten and/or molybdenum), an acidic support (typically a molecular sieve showing high shape selectivity, and having a topology such as MOR, FER, MRE, MWW, AEL, TON and MTT) and a refractory support (such as alumina, silica or titania, or combinations thereof).

Isomerization conditions involve a temperature in the interval 250-400° C., a pressure in the interval 20-100 bar, and a liquid hourly space velocity (LHSV) in the interval 0.5-8.

The material catalytically active in hydrocracking HCR is of similar nature to the material catalytically active in isomerization, and it typically comprises an active metal (either elemental noble metals such as platinum and/or palladium or sulfided base metals such as nickel, cobalt, tungsten and/or molybdenum), an acidic support (typically a molecular sieve showing high cracking activity, and having a topology such as MFI, BEA and FAU) and a refractory support (such as alumina, silica or titania, or combinations thereof). The difference to material catalytically active isomerization is typically the nature of the acidic support, which may be of a different structure (even amorphous silica-alumina) or have a different acidity e.g. due to silica: alumina ratio.

Hydrocracking HCR conditions involve a temperature in the interval 250-400° C., a pressure in the interval 30-150 bar, and a liquid hourly space velocity (LHSV) in the interval 0.5-8, optionally together with intermediate cooling by quenching with cold hydrogen, feed or product Other types of hydrotreating are also envisaged, for instance hydrodearomatization (HDA). The material catalytically active in hydrodearomatization typically comprises an active metal (typically elemental noble metals such as platinum and/or palladium but possibly also sulfided base metals such as nickel, cobalt, tungsten and/or molybdenum) and a refractory support (such as amorphous silica-alumina, alumina, silica or titania, or combinations thereof).

Hydrodearomatization conditions involve a temperature in the interval 200-350° C., a pressure in the interval 20-100 bar, and a liquid hourly space velocity (LHSV) in the interval 0.5-8.

In a second aspect, the invention is a plant, i.e. process plant, for producing a hydrocarbon product, comprising:
  a thermal decomposition section, such as a pyrolysis section, arranged to receive a solid renewable feedstock for producing a first off-gas stream, such as a pyrolysis off-gas stream, comprising hydrocarbons, and a liquid oil stream, such as a pyrolysis oil stream;
  a hydroprocessing section arranged to receive said liquid oil stream and a compressed hydrogen-rich feed stream for producing a main hydrotreated stream;
  a separation section arranged to receive said main hydrotreated stream for producing an aqueous stream, a hydrogen-rich stream, a second off-gas stream comprising hydrocarbons, and said hydrocarbon product, boiling at above 50° C.;
  a separation unit for removing $H_2S$, which is preferably at least one of an amine absorption unit, a caustic scrubber, and a sulfur absorbent unit, arranged to receive said second off-gas stream;
  a hydrogen producing unit (HPU) arranged to receive said first off-gas stream and/or said second off-gas stream for producing a make-up hydrogen stream;
  a compressor section arranged to receive said hydrogen-rich stream and at least a portion of the make-up hydrogen stream produced in said HPU, for generating said compressed hydrogen-rich stream and a make-up hydrogen recycle stream;
  a conduit for passing said first off-gas stream to said HPU;
  a conduit for passing said hydrogen-rich stream to said compressor section, in which there is no separation unit for removing $H_2S$ and/or $CO_2$, optionally also for removing $NH_3$ and/or CO, from said hydrogen-rich stream, upstream said hydroprocessing section;
  a conduit for passing said make-up hydrogen stream from the HPU to said compressor section;
  optionally a conduit for recycling said make-up hydrogen recycle stream to the HPU.
  optionally means for splitting said hydrogen-rich stream for forming a split hydrogen-rich stream, and a conduit for passing said split hydrogen-rich stream to said HPU.

Any of the embodiments and associated benefits of the first aspect of the invention may be used together with the second aspect of the invention, or viceversa.

BRIEF DESCRIPTION OF THE DRAWING

The accompanying FIGURE shows a schematic flow diagram of the overall process/plant, i.e. integrated process/plant, according to a specific embodiment of the invention.

DETAILED DESCRIPTION

With reference to the FIGURE, a block flow diagram of the overall process/plant 10 is shown, where a solid renewable feedstock 11 such as a lignocellulosic biomass is fed to a thermal decomposition section illustrated here by pyrolysis section 105 thereby producing a pyrolysis oil stream 12 and first off-gas stream as pyrolysis off-gas stream 13. The pyrolysis section 105 comprises a feed preparation section for e.g. drying a particle size reduction, fast pyrolysis unit as well as downstream separation unit(s) such as cyclone and a cooling unit (none of these units are shown here), thereby producing the pyrolysis oil stream 12 and the pyrolysis off-gas stream 13. The pyrolysis oil stream 12 is fed to the hydroprocessing section 110. This section comprises a feed preparation section and reactor section including HDO, HDW and optionally also HCR units, for producing a main hydrotreated stream 14, which is then passed to separation section 120 which produces: aqueous (water) stream 16; hydrogen-rich stream 18 preferably having 50% vol. $H_2$ or more, light hydrocarbons, $H_2S$, CO and $CO_2$; second off-gas stream 20 comprising hydrocarbons such as light hydrocarbon stream, also comprising $NH_3$, CO, $CO_2$ and $H_2S$ and optionally also hydrogen not consumed in the hydrotreating unit(s) as soluble hydrogen in hydrocarbon phase; and hydrocarbon products in the form of renewable diesel 22, renewable jet fuel 24 and renewable naphtha 26. The hydrogen-rich stream 18 is not subjected to a separation stage for removing $H_2S$ and/or $CO_2$, optionally also for removing $NH_3$ and/or CO, prior to being passed to the hydroprocessing section. The hydrogen-rich stream 18 (first recycle stream 28), which is used in the hydroprocessing section 110, is split to form a split hydrogen-rich stream 30 (third recycle stream) which is used in the hydrogen producing unit 140. Second off-gas stream 20 from the separation section 120, which is much smaller than hydrogen-rich stream 18, passes to a $H_2S$ separation unit 130 for $H_2S$ removal, thereby forming a treated second off-gas stream 32 (second recycle stream), which is then used as hydrocarbon feed for the hydrogen producing unit 140, together with the pyrolysis off-gas 13.

The hydrogen producing unit 140 comprises a first section 142 which includes a cleaning unit such as sulfur-chlorine-metal absorption or catalytic unit, one or more pre-reformer units, steam reforming unit e.g. convection reformer (HTCR unit) or electrically heated steam reformer (e-SMR), water gas shifting unit(s), $CO_2$-separator unit e.g. an amine absorber, as it is well known in the art of hydrogen production; none of these units are shown here. An optional hydrogen purification unit, such as PSA unit 144, is provided to further enrich the gas and produce a make-up hydrogen stream 36. This PSA-unit 144 is also used to purify the split hydrogen-rich stream 30. Off-gas 38 from the PSA unit (PSA off-gas) is used as fuel in the hydrogen producing unit, e.g. as fuel for HTCR unit, particularly the burner of the HTCR unit, as well as in the hydroprocessing section 110. Apart from the pyrolysis off-gas 13, another hydrocarbon feed produced in the process such as LPG stream 34 which is generated in separation section 120, may be used as make-up gas for the steam reforming in the hydrogen producing unit 140. Hence, rather than using natural gas (from external sources) as the make-up gas, and/or using potential valuable naphtha stream 26 as hydrocarbon feed in the hydrogen producing unit 140, pyrolysis off-gas 13, second off-gas 20 or 32 and optionally LPG 34, respectively, are utilized.

The hydrogen-rich stream 28 passes to a compressor section 150 which includes a recycle compressor and make-up gas compressor, not shown. The hydrogen-rich gas stream 28 and make-up hydrogen stream 36 are then compressed by respectively the recycle compressor and the make-up compressor and used for adding hydrogen as stream 40 into the hydroprocessing section 110. From the make-up compressor, a hydrogen stream 42 (make-up hydrogen recycle stream) is recycled to hydrogen producing unit 140.

The invention claimed is:

1. A process for producing a hydrocarbon product, said process comprising the steps of:
    i) passing a solid renewable feedstock through a thermal decomposition section, for producing:
        a first off-gas stream comprising hydrocarbons, and
        a liquid oil stream;
    ii) passing the liquid oil stream through a hydroprocessing section thereby producing a main hydroprocessed stream;
    iii) passing the main hydroprocessed stream to a separation section thereby producing:
        an aqueous stream,
        a hydrogen-rich stream,
        a second off-gas stream comprising hydrocarbons, and said hydrocarbon product, boiling at above 50° C.;
    iv) passing the hydrogen-rich stream from the separation section to the hydroprocessing section, wherein $H_2S$ is not removed from the hydrogen-rich stream prior to being passed to the hydroprocessing section;
    v) passing the first off-gas stream from step i) and/or the second off-gas stream from step iii) to a hydrogen producing unit, for producing a make-up hydrogen stream;
    vi) passing the make-up hydrogen stream to the hydroprocessing section;
    wherein in step iii) the separation section comprises:
    iii-1) passing the main hydroprocessed stream to a separator for producing said aqueous stream, said hydrogen-rich stream, and a heavy hydrocarbon stream;
    iii-2) passing the heavy hydrocarbon stream to a fractionation section for producing said second off-gas stream and said hydrocarbon product; and wherein prior to conducting step v), said second off-gas stream from step iii) passes to a separation unit for removing $H_2S$.

2. Process according to claim 1, wherein said separation unit is at least one of an amine absorption unit, a caustic scrubber, and a sulfur absorbent unit.

3. Process according to claim 1, wherein the thermal decomposition section is a pyrolysis section, thereby producing said first off-gas stream as a pyrolysis off-gas stream and said liquid oil stream as a pyrolysis oil stream.

4. Process according to claim 1, wherein the thermal decomposition section is hydrothermal liquefaction.

5. Process according to claim 1, wherein the process further comprises: vii) splitting said hydrogen-rich stream for forming a split hydrogen-rich stream and passing said split hydrogen-rich stream to said hydrogen producing unit.

6. Process according to claim 1, wherein in step ii) the hydroprocessing section comprises:
    ii-1) passing the liquid oil stream through a first catalytic hydrotreating unit under the addition of hydrogen for producing a first hydrotreated stream;
    ii-2) passing the first hydrotreated stream to a dewaxing section comprising a second catalytic hydrotreating unit under the addition of hydrogen for producing said main hydrotreated stream; and
    wherein between step ii-1) and ii-2) the process further comprises passing the first hydrotreated stream to a separator for removing $H_2S$, $NH_3$, and $H_2O$, thereby producing said first hydrotreated stream.

7. Process according to claim 6, wherein in step vi) the make-up hydrogen stream passes to at least one of:
    said first catalytic hydrotreating unit;
    said separator between step ii-1) and ii-2); and
    second catalytic hydrotreating unit.

8. Process according to claim 1, wherein the separation section in step iii) also produces an LPG stream and the process further comprises feeding the LPG stream to the hydrogen producing unit.

9. Process according to claim 1, wherein the hydrogen producing unit comprises subjecting the first off-gas stream and the second off-gas stream to cleaning in a cleaning unit, said cleaning unit being a sulfur-chlorine-metal absorption or catalytic unit.

10. Process according to claim 1, wherein the hydrogen-rich stream or split hydrogen-rich stream comprises hydrogen in a concentration of 50 vol. % or higher, and wherein any of said streams is passed through a hydrogen purification unit: prior to splitting said hydrogen-rich stream for forming said split hydrogen-rich stream, or prior to passing the hydrogen-rich stream to the hydroprocessing stage, or prior to passing said split hydrogen-rich stream to the hydrogen producing unit.

11. Process according to claim 9, wherein the hydrogen purification unit is the hydrogen purification unit of the hydrogen producing unit and said split hydrogen-rich stream is passed through this hydrogen purification unit.

12. Process according to claim 11, wherein the hydrogen purification unit is a Pressure Swing Adsorption unit (PSA unit), said PSA unit producing a PSA off-gas stream which is used as fuel in the steam reforming unit of the hydrogen producing unit, and/or in fired heaters in the hydrogen producing unit, and/or in fired heaters in any of the catalytic hydrotreating units of the hydroprocessing section, separation units of the separation section, and/or for steam production; and wherein the steam reforming unit is: a convection reformer, a tubular reformer, autothermal reformer, electrically heated steam methane reformer, or combinations thereof.

13. Process according to claim 1, wherein prior to passing the make-up hydrogen stream to the hydroprocessing section, the make-up hydrogen stream passes through a compressor section comprising a make-up compressor, the make-up compressor generating a hydrogen recycle stream which is added to the hydrogen producing unit.

14. Process according to claim 1, wherein the solid renewable feedstock is:
   a lignocellulosic biomass including: wood products, forestry waste, and agricultural residue; and/or
   municipal waste, in particular the organic portion thereof, where the municipal waste is defined as a feedstock containing materials of items discarded by the public, such as mixed municipal waste given the waste code 200301 in the European Waste Catalog.

15. Plant for producing a hydrocarbon product, comprising:
   a thermal decomposition section such as a pyrolysis section arranged to receive a solid renewable feedstock for producing a first off-gas stream comprising hydrocarbons, and a liquid oil stream;
   a hydroprocessing section arranged to receive said liquid oil stream and a compressed hydrogen-rich stream for producing a main hydrotreated stream;
   a separation section arranged to receive said main hydrotreated stream for producing an aqueous stream, a hydrogen-rich stream, a second off-gas stream comprising hydrocarbons, and said hydrocarbon product, boiling at above 50° C.;
   a separation unit for removing $H_2S$ arranged to receive said second off-gas stream;
   a hydrogen producing unit (HPU) arranged to receive said first off-gas stream and/or said second off-gas stream for producing a make-up hydrogen stream;
   a compressor section arranged to receive said hydrogen-rich stream and at least a portion of the make-up hydrogen stream produced in said HPU, for generating said compressed hydrogen-rich stream and a make-up hydrogen recycle stream;
   a conduit for passing said first off-gas stream to said HPU;
   a conduit for passing said hydrogen-rich stream to said compressor section; and
   a conduit for passing said make-up hydrogen stream from the HPU to said compressor section;
   wherein the plant is configured to pass said hydrogen-rich stream from said separation section to said hydroprocessing section without removal of $H_2S$ from said hydrogen-rich stream.

16. Process according to claim 13, wherein the compressor section comprises a recycle compressor.

17. Process according to claim 13, wherein the hydrogen recycle stream is added directly to the first off-gas stream and/or to the second off-gas stream entering the hydrogen producing unit, and/or to the cleaning unit of the hydrogen producing unit.

18. Plant according to claim 15, wherein the separation unit for removing $H_2S$ is at least one of an amine absorption unit, a caustic scrubber, and a sulfur absorbent unit.

19. Plant according to claim 15, comprising:
   a conduit for recycling said make-up hydrogen recycle stream to the HPU; and
   means for splitting said hydrogen-rich stream for forming a split hydrogen-rich stream, and a conduit for passing said split hydrogen-rich stream to said HPU.

* * * * *